(12) United States Patent
Youn

(10) Patent No.: US 8,260,379 B2
(45) Date of Patent: Sep. 4, 2012

(54) MOBILE ELECTRONIC DEVICE

(75) Inventor: Jinsoo Youn, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/004,159

(22) Filed: Jan. 11, 2011

(65) Prior Publication Data

US 2011/0312384 A1   Dec. 22, 2011

(30) Foreign Application Priority Data

Jun. 21, 2010 (KR) ........................ 10-2010-0058743

(51) Int. Cl.
*H04M 1/00* (2006.01)
(52) U.S. Cl. .................................. 455/575.1; 455/575.5
(58) Field of Classification Search .................... 360/60; 361/752, 679.38, 695, 679.55, 679.37, 679.36; 455/574, 556.1, 411, 558, 575.1, 575.5, 95, 455/97, 100, 121

See application file for complete search history.

(56) References Cited

U.S. PATENT DOCUMENTS

| | | | | |
|---|---|---|---|---|
| 6,212,026 B1 * | 4/2001 | Ohmi et al. | ..................... | 360/60 |
| 2003/0123235 A1 * | 7/2003 | Hsu et al. | ..................... | 361/752 |

* cited by examiner

*Primary Examiner* — Kiet Doan
(74) *Attorney, Agent, or Firm* — Morgan, Lewis & Bockius LLP

(57) ABSTRACT

A mobile electronic device includes: a main body to which a reading device of a storage medium is detachably coupled; an accommodation chamber formed in the main body to accommodate the reading device when the reading device is coupled to the main body; and a communication module configured to transmit and receive a radio signal, inserted into the accommodation chamber in a state in which the reading device is separated, and electrically connected with the main body.

9 Claims, 7 Drawing Sheets

MOBILE ELECTRONIC DEVICE

CROSS REFERENCE TO RELATED APPLICATIONS

The present application claims priority to Korean Application No. 10-2010-0058743 filed in Korea on Jun. 21, 2010, the entire contents of which is hereby incorporated by reference in its entirety.

BACKGROUND OF THE INVENTION

1. Field of the Invention

The present invention relates to a mobile electronic device having a wireless communication function.

2. Description of the Related Art

A mobile electronic device is a device that can be carried around and has one or more functions such as voice and video call communication, inputting and outputting information, storing data, and the like.

As such functions become more diversified, the mobile electronic device can support more complicated functions such as capturing images or video, reproducing music or video files, playing games, receiving broadcast signals, and the like. By comprehensively and collectively implementing such functions, the mobile electronic device may be embodied in the form of a multimedia player or device.

Efforts are ongoing to support and increase the functionality of mobile electronic devices. Such efforts include software and hardware improvements, and for example, an antenna may be mounted in the mobile electronic device to allow the user to be provided with various radio services.

However, when an antenna is mounted, the size of a mobile electronic device increases due to the space installed by the antenna, degrading the portability of the mobile electronic device. Thus, a mechanism considering portability of the mobile electronic device and the implementation of a radio communication function may be taken into consideration.

SUMMARY OF THE INVENTION

Accordingly, one object of the present invention is to allow a user to selectively use a wireless communication function while maintaining the portability of a mobile electronic device.

An aspect of the present invention provides a mobile electronic device including: a main body to which a reading device of a storage medium is detachably coupled; an accommodation chamber formed in the main body to accommodate the reading device when the reading device is coupled to the main body; and a communication module configured to transmit and receive a radio signal, inserted into the accommodation chamber in a state in which the reading device is separated, and electrically connected with the main body.

In an exemplary embodiment of the present invention, the communication module may include an antenna, a circuit board, and a card socket. The antenna may be configured to transmit and receive the radio signal. The circuit board may be disposed within the communication module and connected to the antenna to process the radio signal. The card socket may be stacked on the circuit board and configured to accommodate an external card.

In another exemplary embodiment of the present invention, a connection port electrically connected with the reading device may be disposed in the accommodation chamber, and a communication port which is connected with the circuit board and can be connected with the connection port may be disposed in the communication module. The antenna may be mounted to be pivoted on one surface of the communication module such that it is protruded from the main body.

In another exemplary embodiment of the present invention, the main body may include first and second bodies. A user input unit may be disposed on a front surface of the first body in order to receive a control command. The second body is rotatably coupled with the first body and includes a display area of a display on a circumferential surface thereof. An opening of the accommodation chamber may be formed on the side of the first body.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
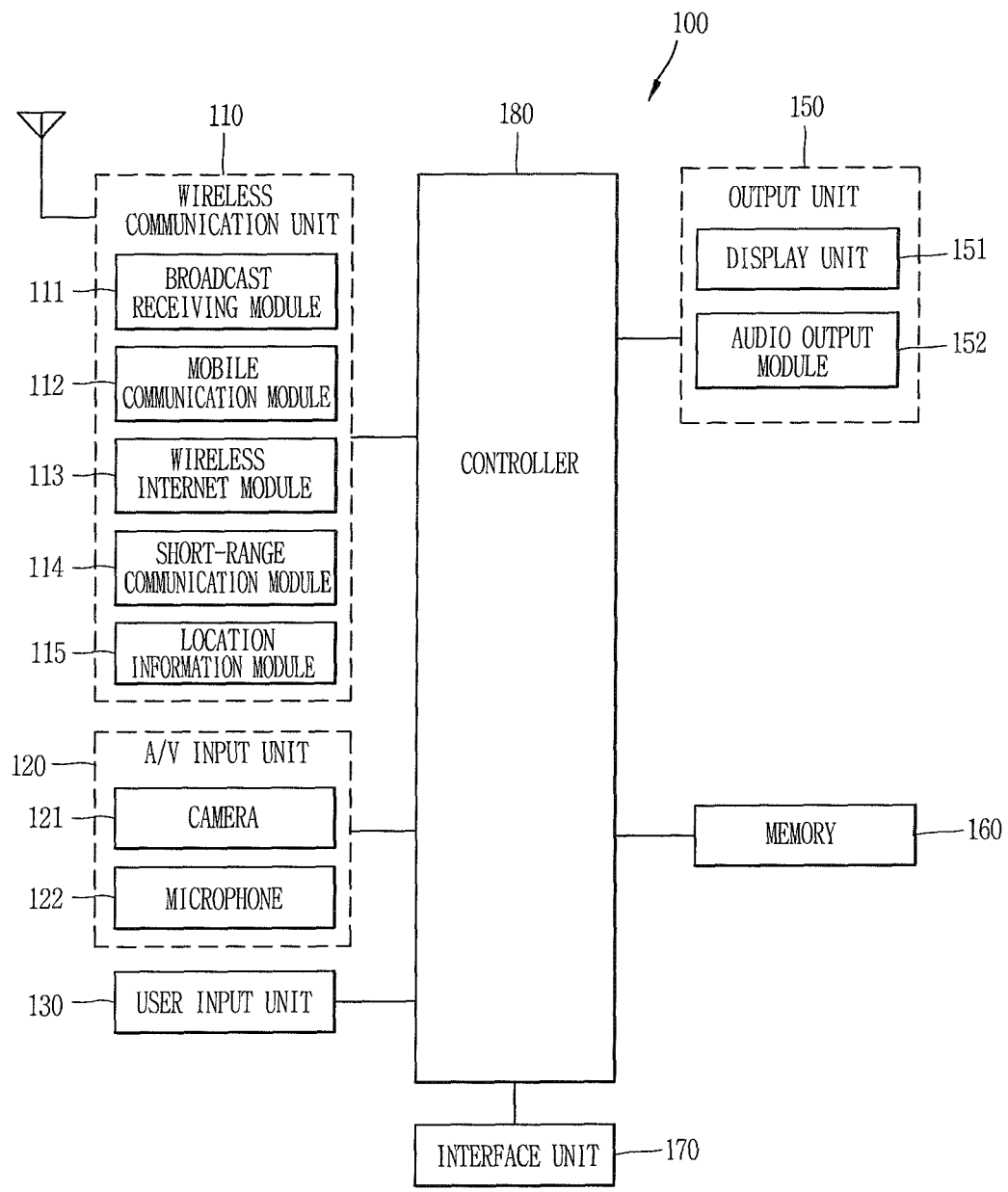
FIG. 1 is a schematic block diagram of a mobile electronic device according to an exemplary embodiment of the present invention.

A mobile electronic device according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The same elements or equivalents are referred to as the same reference numerals even in the different embodiments throughout the specification, and repeated content and explanation as those in a former embodiment will be omitted. The expression in the singular form in this specification will cover the expression in the plural form unless otherwise indicated obviously from the context.

The mobile electronic device described in the present invention may include mobile phones, smart phones, notebook computers, digital broadcast receivers, PDAs (Personal Digital Assistants), PMPs (Portable Multimedia Player), navigation devices, and the like.

FIG. 1 is a front perspective view of a mobile electronic device according to an exemplary embodiment of the present invention.

The mobile electronic device 100 may include a wireless communication unit 110, an A/V (Audio/Video) input unit 120, a user input unit 130, a sensing unit 140, an output unit 150, a memory 160, an interface unit 170, a controller 180, and a power supply unit 190, and the like. FIG. 1 shows the mobile electronic device as having various components, but it should be understood that implementing all of the illustrated components is not a requirement. Greater or fewer components may alternatively be implemented.

The wireless communication unit 110 typically includes one or more components allowing radio communication between the mobile electronic device 100 and a wireless communication system or a network in which the mobile electronic device is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile electronic device. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile electronic device. A typical example of the location information module is a GPS (Global Positioning System).

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile electronic device.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile electronic device. The user input unit 130 may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid in a layered manner with the display unit 151 (to be described), it may be called a touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile electronic device 100. For example, the display unit 151 may display a User Interface (UI) or a Graphic User Interface (GUI) in relation to various modes of the mobile electronic device.

When the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

A proximity sensor may be disposed within or near the touch screen. The proximity sensor is a sensor for detecting the presence or absence of an object relative to a certain detection surface or an object that exists nearby by using the force of electromagnetism or infrared rays without a physical contact. By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile electronic device 100 (e.g., a call signal reception sound, a message reception sound, etc.). The audio output module 152 may include a speaker, a buzzer, or other sound generating device.

The memory 160 may store software programs used for the processing and controlling operations performed by the controller 180, or may temporarily store data (e.g., a phonebook, messages, still images, video, etc.) that are inputted or outputted. The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk.

The interface unit 170 serves as an interface with every external device connected with the mobile electronic device 100. For example, the external devices may transmit data to an external device, receives and transmits power to each element of the mobile electronic device 100, or transmits internal data of the mobile electronic device 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The controller 180 typically controls the general operations of the mobile electronic device. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Figure 2:
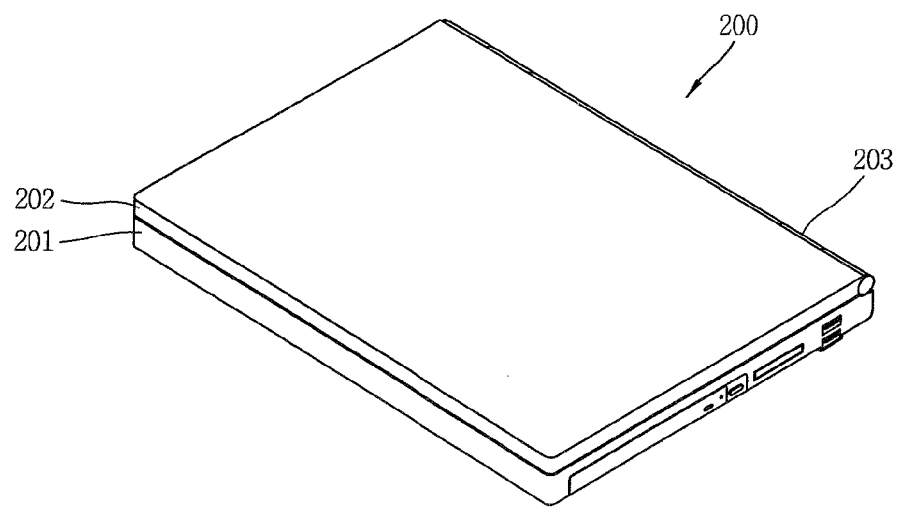
FIG. 2 is a perspective view showing a closed configuration of the mobile electronic device according to an exemplary embodiment of the present invention.
Figure 3:
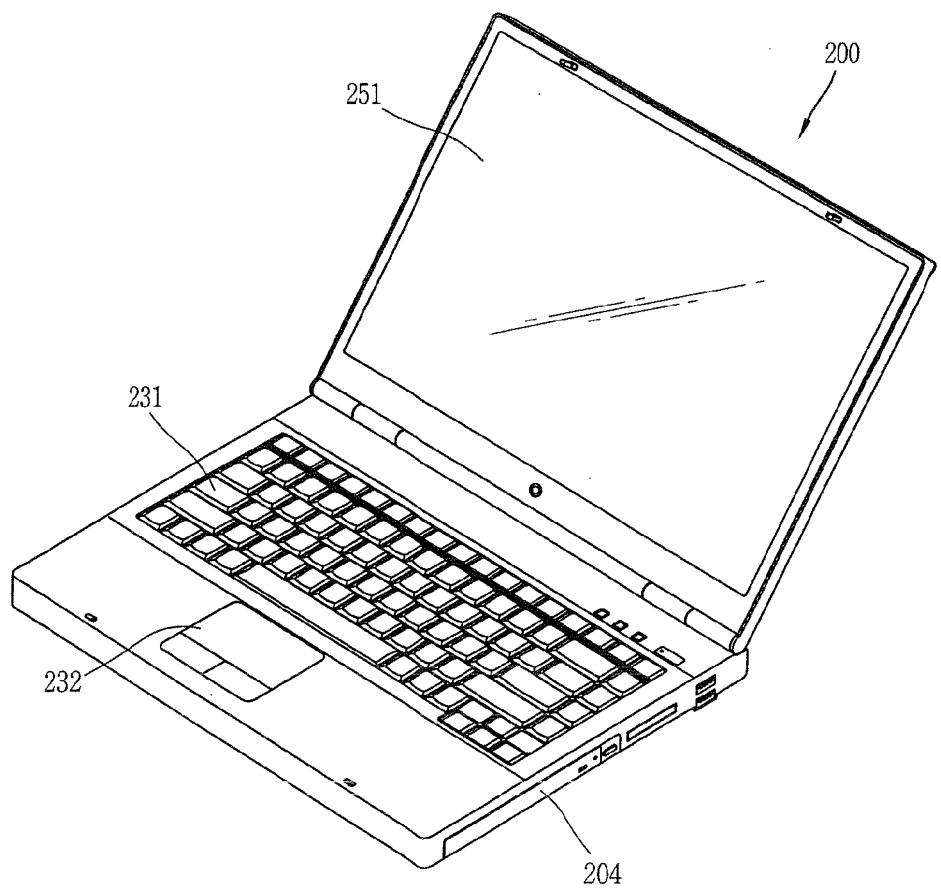
FIG. 3 is a perspective view showing an open configuration of the mobile electronic device of FIG. 2.

FIG. 2 is a perspective view showing a closed configuration of the mobile electronic device according to an exemplary embodiment of the present invention, and FIG. 3 is a perspective view showing an open configuration of the mobile electronic device of FIG. 2.

As shown in FIGS. 2 and 3, the mobile electronic device 200 includes a first body 201 having an input device and a second body 202 connected to the first body 201 such that it can be opened and closed with respect to the first body 201.

The input device is configured as the user input unit 130 (See FIG. 1), and may include a keypad 21 having a plurality of keys and a touch pad 232 for performing inputting by a touch. In addition, the input device may include at least one button for performing inputting (e.g., turning on and off power, adjusting volume, resetting, and the like), which is differentiated from the keypad 231 and formed at a certain position of the first body 201 or the second body 202.

The first body 201 and the second body 202 include a case (a casing, a housing, a cover, and the like). The case may include an inner case or an outer case. The cases may be formed by injection-molding a synthetic resin or may be made of a metallic material such as a magnesium alloy, stainless steel (STS) or titanium (Ti), etc.

The second body 202 is connected to the first body 201 by a hinge part 203 such that a certain opening angle is implemented. The hinge part 203 electrically serves to support the second body 202 to be rotatable with respect to the first body 201 and electrically serves as a passage through which wires pass to connect various components included in the second body 202 to the first body 201.

A display area 251 of a display for outputting visual information is formed on a front surface of the second body 202 which is closed. The display area of the display is formed by a window mounted on a main surface of the second body and the display stacked under the window. The display may be implemented by a Liquid Crystal Display (LCD), a Thin Film Transistor-LCD (TFT-LCD), an Organic Light Emitting Diode (OLED), a flexible display, a three-dimensional (3D) display, and the like. Some of the displays may be configured to be transparent or light-transmissive to allow viewing of the exterior therethrough. The rear structure of the display may be also configured to have the light-transmissive structure. With such a structure, the user can view an object located at a rear side of the terminal body through the region occupied by the display unit 151 of the terminal body. The mobile terminal 100 may include two or more display units according to its embodiment. For example, a plurality of display units may be separately or integrally disposed on one surface or disposed on different surfaces of the mobile terminal, respectively.

Figure 4:
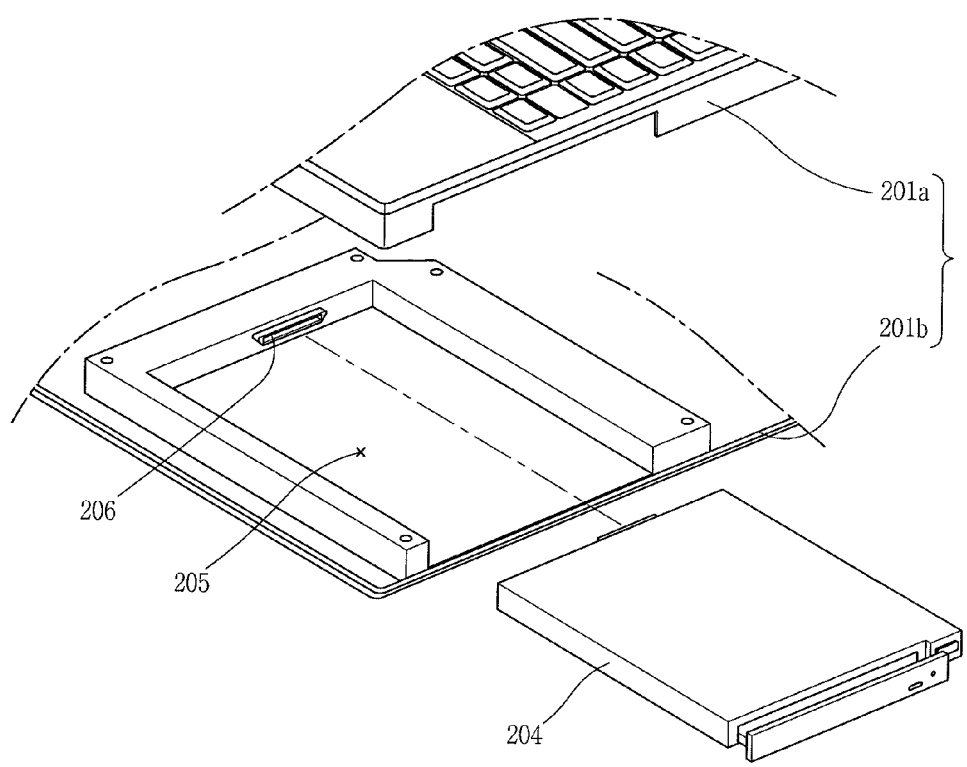
FIG. 4 is an exploded perspective view showing a portion of the mobile electronic device of FIG. 2.

The mobile electronic device 200 illustrated in FIG. 3 may include a reading device 204, and after the reading device 204 is separated, a communication module 210 (See FIG. 5) may be mounted to the area from which the reading device 204 has been removed. The communication module 210 will now be described in more detail with reference to FIGS. 4 and 5. FIG. 4 is an exploded perspective view showing a portion of the mobile electronic device of FIG. 2, and FIG. 5 is an exploded view of a communication module mounted in an accommodation chamber of FIG. 4.

With reference to FIG. 4, the reading device 204 of a storage medium is detachably mounted to the side of the first body 201. The storage medium may be a CD, a DVD, and the like, and the reading device 204, which may be a CD ROM driver, a DVD ROM driver, and the like, reads the records of the storage medium.

As illustrated, the first body 201 includes an accommodation chamber 205 in order to receive the reading device 204 when the reading device 204 is coupled to the mobile electronic device 200. The accommodation chamber 205 is limited by a front case 201a and a rear case 201b of the first body 201. An opening of the accommodation chamber 205 is formed at the side of the first body 201, and a connection port 206 electrically connected to the reading device 204 is disposed in the accommodation chamber 205. When the reading device 204 is separated, the communication module 210 may be inserted in the accommodation chamber 205.

Figure 5:
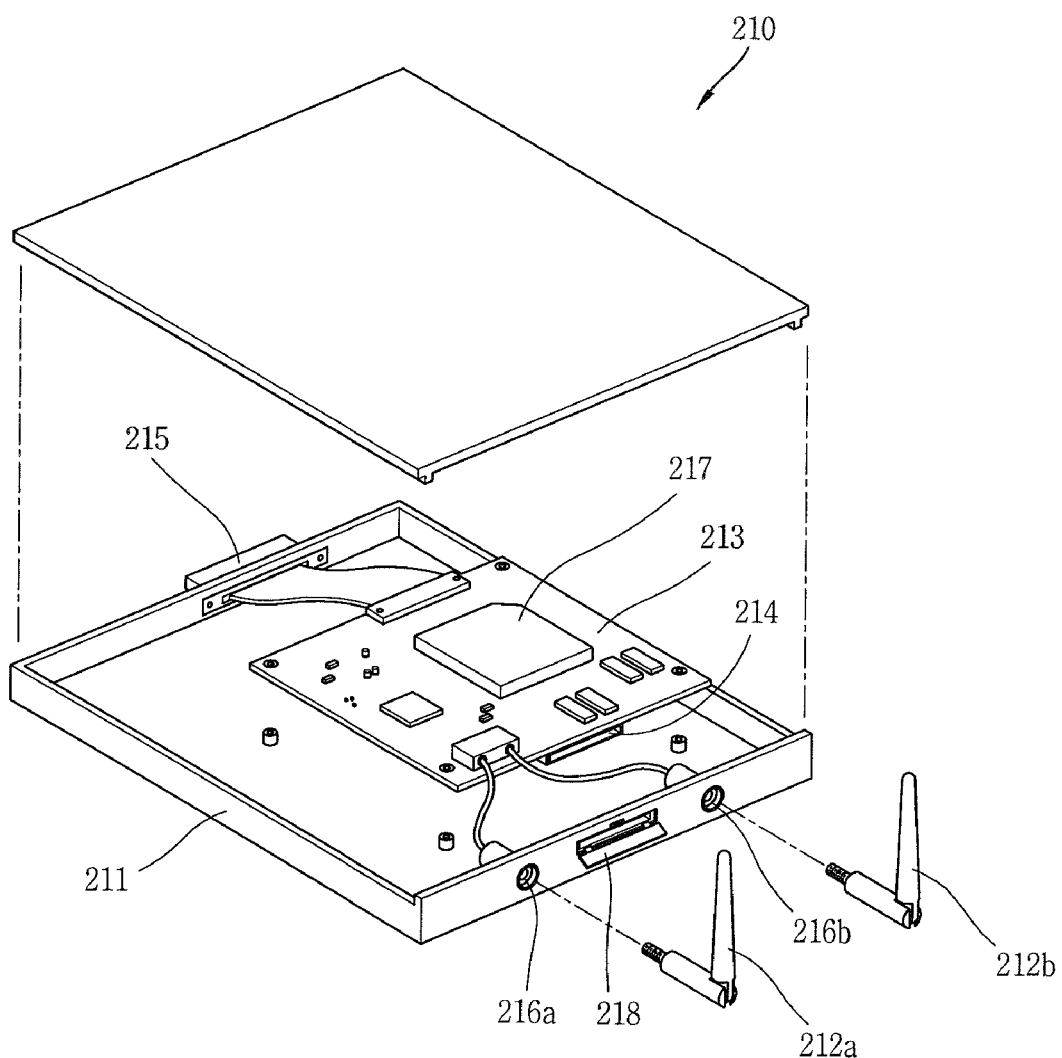
FIG. 5 is an exploded view of a communication module mounted in an accommodation chamber of FIG. 4.

With reference to FIGS. 4 and 5, the communication module 210 is formed to transmit and receive a radio signal, and is electrically connected to the first body 201 to perform controlling corresponding to the radio signal. For example, the communication module 210 includes a communication port 215 which can be connected to the connection port 20, and in this case, the communication port 215 is configured to be connected to the connection port 206 in a similar or same manner as a connection port 204a of the reading device 204 does.

As illustrated in FIG. 5, the communication module 210 includes a housing 211, antennas 212a and 212b, a circuit board 213, and a card socket 2114.

The housing 211 is configured to have the same or similar external appearance as that of the reading device 204 so as to be accommodated in the accommodation chamber 205.

The antennas 212a and 212b are configured to transmit and receive a radio signal. The antennas 212a and 212b may be configured such that their length varies, and a frequency band for a transmission and reception may be set according to the length of the antennas 212a and 212b. The antennas 212a and 212b may be pivotably mounted on the housing 211 such that they are protruded from the first body 201.

For example, mounting holes 216a and 216b are formed on one surface of the housing 211 and the antenna 212a and 212b are detachably inserted in the mounting holes 216a and 216b and rotated in the mounting holes 216a and 216b. In addition, the antennas 212a and 212b may be formed to be folded by a hinge, and a plurality of antennas may be provided to transmit and receive radio signals of multiple bands.

The circuit board 213 is disposed within the housing 211. The circuit board 213 may be formed to process a radio signal transmitted and received through the antennas. For example, an electronic element 217 may be mounted on one surface of the circuit board 213 in order to perform 3G or 4G radio communication. The circuit board 213 may be connected to the communication port 215 by means of a flexible circuit board. However, the present invention is not limited thereto, and the 3G or 4G radio communication device may be installed in the first body 201 or the second body 202, and the electronic device 217 may be optional to perform radio communication such as EV-DO, HSPA, WiBro, LTE, and the like.

The card socket 214 is stacked on the circuit board 213 and configured to accommodate an external card. In detail, the accommodated external card, having a standardized form such as a SIM (Subscriber Identification Module) or a UIM (User Information Module), is inserted into the card socket 214 and electrically connected to the circuit board 213. The card socket 214 is mounted on the opposite side of the electronic element 217 on the circuit board 213, thereby exhibiting an effect of shield can.

As illustrated, the card socket 214 is disposed between the mounting holes 216a and 216b of the antennas 212a and 212b, and a door 218 for opening and closing the card socket 214 may be mounted on the housing 211. The mounting holes 216a and 216b and the door 218 may be disposed on the side of the first body 201 when the communication module 210 is mounted on the first body 201.

In this manner, the interface allowing the reading device 204 to be detachably mounted and the communication module 210 to be selectively mounted is configured, so when the user does not use the reading device 204, he may use an Internet service, or the like, using a mobile communication network. Also, because the communication module 210 is not always mounted in the mobile electronic device, the mobile electronic device can have a smaller size.

Also, because the communication module 210 is mounted in the accommodation chamber 205 of the first body 201, it does not affect the transmission and reception performance of the communication module 210. Accordingly, the components in relation to radio communication can be packaged into the communication module 210.

Figure 6:
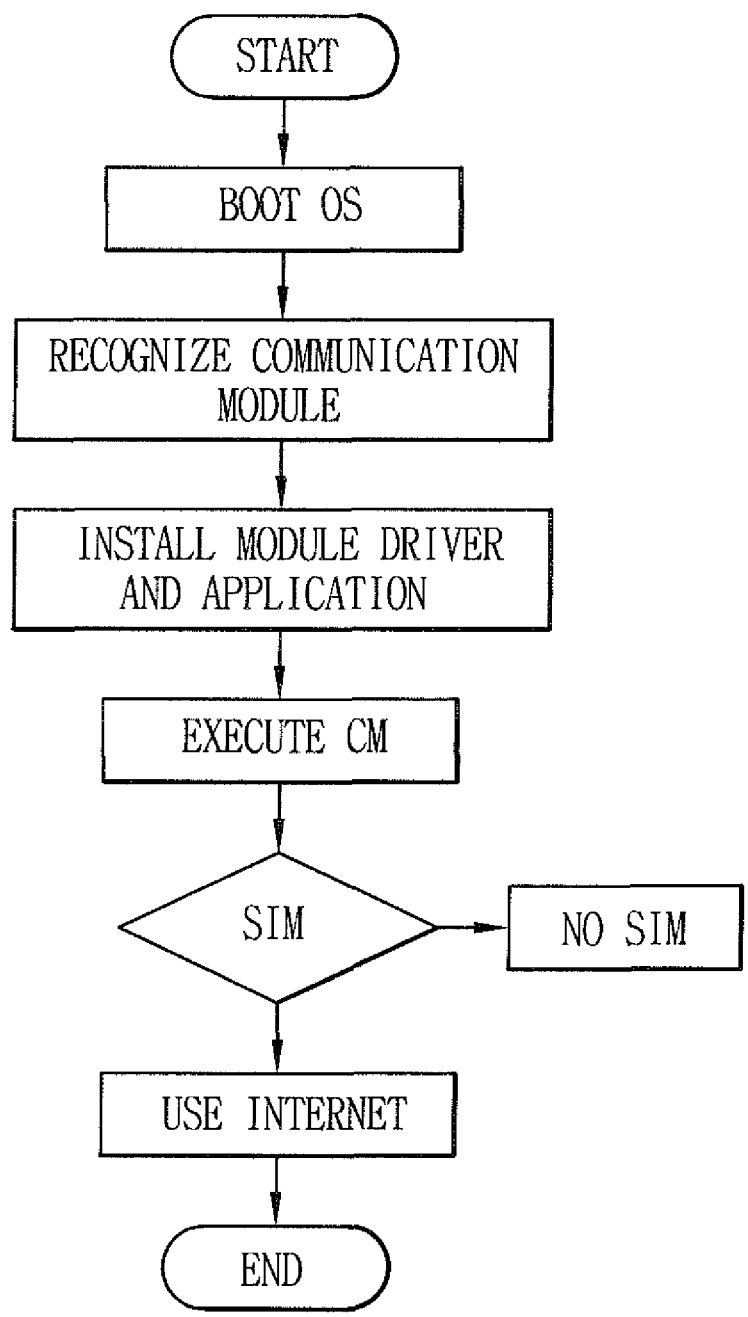
FIG. 6 is a flow chart illustrating the process of a method of using the communication module of FIG. 4.
Figure 7:
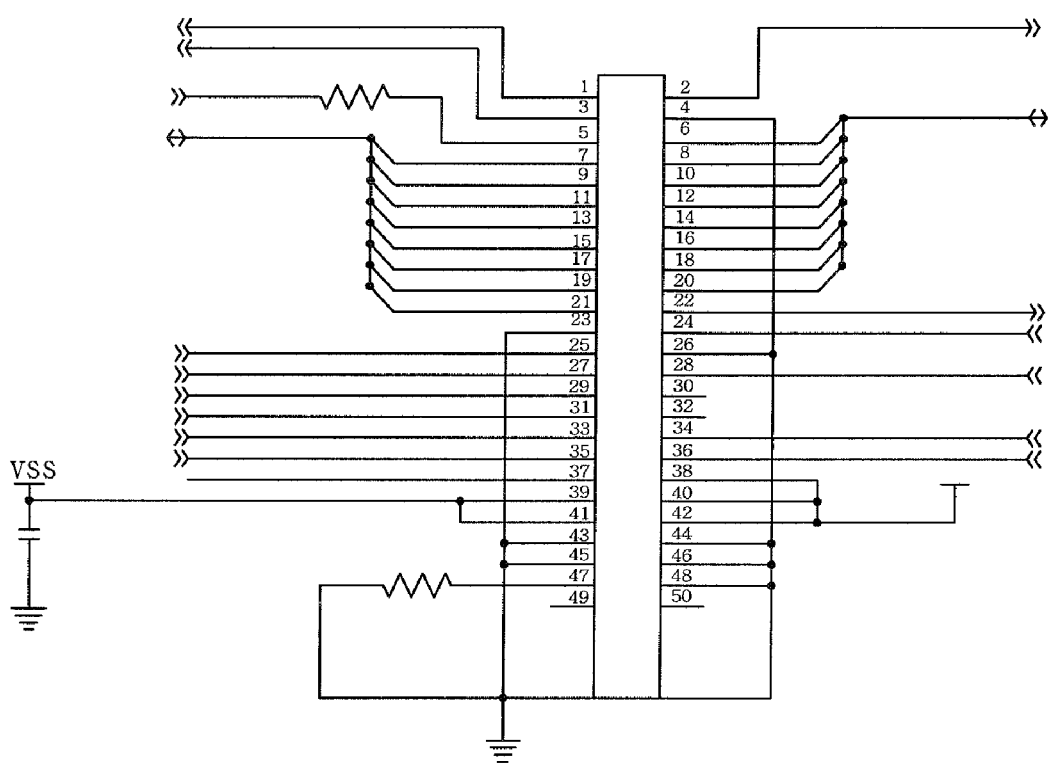
FIG. 7 is a circuit diagram showing a circuit connection of a connection port of FIG. 4.

FIG. 6 is a flow chart illustrating the process of a method of using the communication module of FIG. 4, and FIG. 7 is a circuit diagram showing a circuit connection of the connection port 206 of FIG. 4.

A method of using the communication module will now be described. The reading device is usually mounted in the mobile electronic device, and in order to use a mobile communication data service, the user may separate the reading device from the mobile electronic device.

With reference to FIG. 6, the user mounts the communication module and boots the mobile electronic device. A newly mounted mobile communication product is searched on an O/S, and the user may install software (driver, application) of the corresponding communication module. The user mounts the antennas, positions them upright, executes a CM (Connection Manager) program, and connects the Internet.

An electrical connection circuit of the connection port 206 and the communication port 215 (See FIG. 5) may be designed such that a particular pin may be used for a USB D+/D− signal for using the communication module in order to share a connector with an existing ODD (Optical Disk Drive) interface.

For example, as shown in FIG. 7, pins #45 and #46 of the connection port 206 may be designated as ground (GND) pins of the reading device, and as the pins #45 and #46 are connected to a USB port of the electronic element, an interface is implemented between the firs body and the electronic element. Also, the card socket may be implemented as an 8-pin socket interface in a push-push form.

Figure 8:
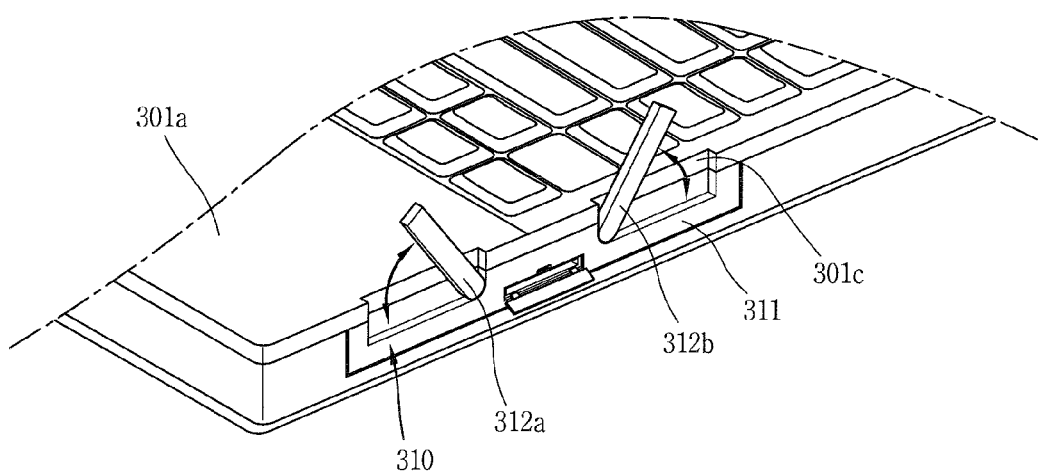
FIG. 8 is an exploded view showing a mobile electronic device according to another exemplary embodiment of the present invention.

FIG. 8 is an exploded view showing a mobile electronic device according to another exemplary embodiment of the present invention. Description of the same or similar configuration as that of the former embodiment described above with reference to FIG. 5 will be omitted.

As illustrated, antennas 312a and 312b are coupled to a housing 311 of a communication module 310 such that they are not separated. In detail, the antennas 312a and 312b are disposed to pivot on a circumferential surface of the housing 311.

A portion of a front surface of a front case 301a corresponding to the opening of the accommodation chamber may be cut out, and the antennas 312a and 312b are disposed on the cutout portion 301c when the communication module 310 is mounted in the accommodation chamber. The antennas 312a and 312b are protruded through the cutout portion 301c through pivoting operation, whereby a transmission and reception of a radio signal can be facilitated.

The mobile electronic device according to an exemplary embodiment of the present invention does not require a component installation space for radio communication because the communication module is electively coupled.

In addition, because the communication module is mounted in the accommodation chamber of the reading device, the display does not affect the transmission and reception performance of the communication module. Also, the design space corresponding to the accommodation chamber can be secured, whereby the components in relation to radio communication can be packaged to the communication module.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile electronic device comprising:
a main body to which a reading device of a storage medium or a communication module is detachably coupled;
an accommodation chamber formed in the main body to alternatively accommodate the reading device and the communication module when one of the reading device and the communication module is alternatively coupled to the main body; and
a connection port disposed in the accommodation chamber, configured to be electrically connected to the reading device or the communication module,
wherein the communication module comprises:
a plurality of antennas configured to transmit and receive radio signals;
a circuit board disposed within the communication module and connected to the antennas to process the radio signals; and
a communication port configured to connect the circuit board with the connection port;
wherein the main body comprises:
a first body including user input unit disposed on a front surface thereof in order to receive a control command;
a second body rotatable coupled with the first body and having a display area of a display; and
an opening of the accommodation chamber formed on the side of the first body.

2. The mobile electronic device of claim 1, wherein the antenna is mounted to be pivoted on one surface of the communication module such that it is protruded from the main body.

3. The mobile electronic device of claim 1, wherein the communication module further comprises:
an electronic element mounted on one surface of the circuit board so as to perform radio communications; and
a card socket stacked on the circuit board and configured to accommodate an external card, and
wherein the card socket is mounted on the opposite side of the electronic element on the circuit board.

4. The mobile electronic device of claim 3, wherein the external card is a SIM card or a UIM card.

5. The mobile electronic device of claim 3, wherein the communication module further comprises mounting holes formed on one surface of the housing, and wherein the antennas are detachably inserted in the mounting holes.

6. The mobile electronic device of claim 5, wherein the card socket is disposed between the mounting holes.

7. The mobile electronic device of claim 1, wherein the communication module is coupled to the main body.

8. A mobile electronic device comprising:
a main body to which a reading device of a storage medium or a communication module is detachably coupled;
an accommodation chamber formed in the main body to alternatively accommodate the reading device and the communication module when one of the reading device and the communication module is alternatively coupled to the main body; and
a connection port disposed in the accommodation chamber, configured to be electrically connected to the reading device or the communication module,
wherein the communication module comprises:
a plurality of antennas configured to transmit and receive radio signals;
a circuit board disposed within the communication module and connected to the antennas to process the radio signals; and
a communication port configured to connect the circuit board with the connection port;
wherein the communication module further comprises:
an electronic element mounted on one surface of the circuit board so as to perform radio communications; and
a card socket stacked on the circuit board and configured to accommodate an external card, and
wherein the card socket is mounted on the opposite side of the electronic element on the circuit board;
wherein the external card is a SIM card or a UIM card.

9. A mobile electronic device comprising:
a main body to which a reading device of a storage medium or a communication module is detachably coupled;
an accommodation chamber formed in the main body to alternatively accommodate the reading device and the communication module when one of the reading device and the communication module is alternatively coupled to the main body; and
a connection port disposed in the accommodation chamber, configured to be electrically connected to the reading device or the communication module,
wherein the communication module comprises:
a plurality of antennas configured to transmit and receive radio signals;
a circuit board disposed within the communication module and connected to the antennas to process the radio signals; and
a communication port configured to connect the circuit board with the connection port;
wherein the communication module further comprises:
an electronic element mounted on one surface of the circuit board so as to perform radio communications; and
a card socket stacked on the circuit board and configured to accommodate an external card, and
wherein the card socket is mounted on the opposite side of the electronic element on the circuit board;
wherein the communication module further comprises mounting holes formed on one surface of the housing, and
wherein the antennas are detachably inserted in the mounting holes.

* * * * *